May 11, 1954
P. G. HUNTER ET AL
2,678,195
MECHANICAL VIBRATOR
Filed June 7, 1951
2 Sheets-Sheet 1
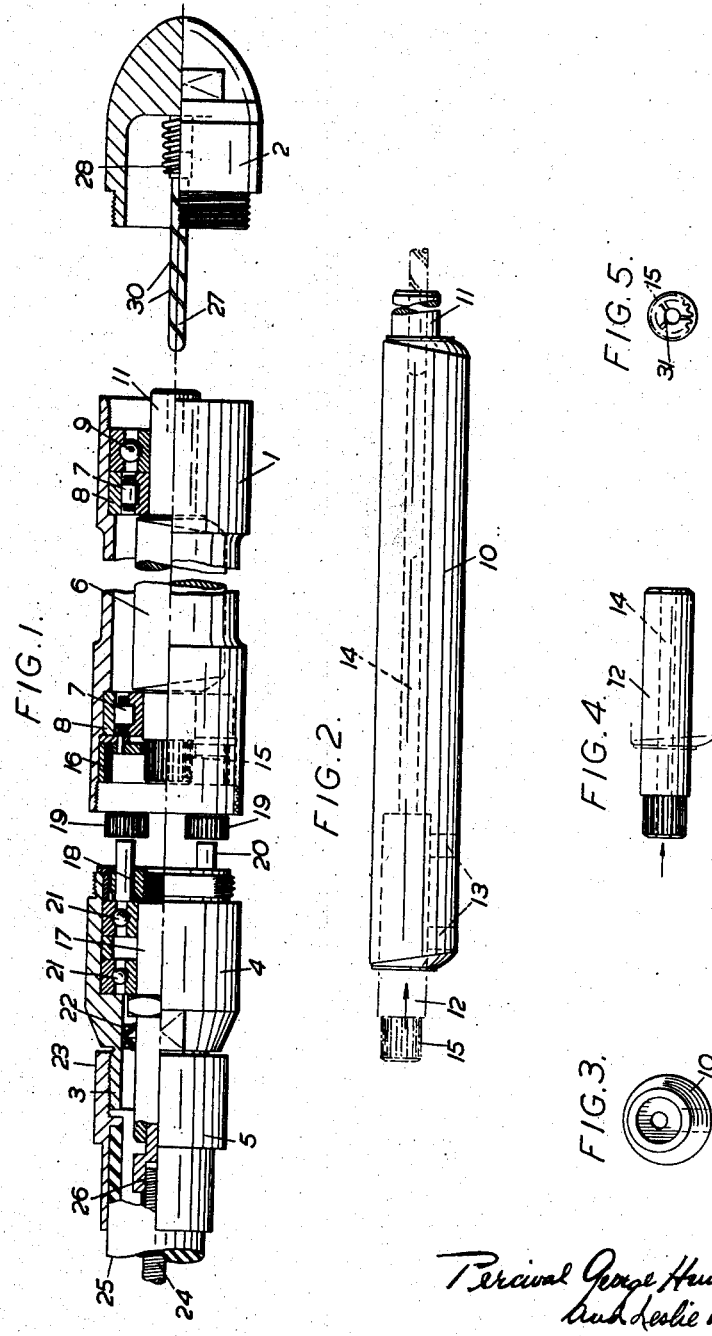

May 11, 1954 P. G. HUNTER ET AL 2,678,195
MECHANICAL VIBRATOR
Filed June 7, 1951 2 Sheets-Sheet 2
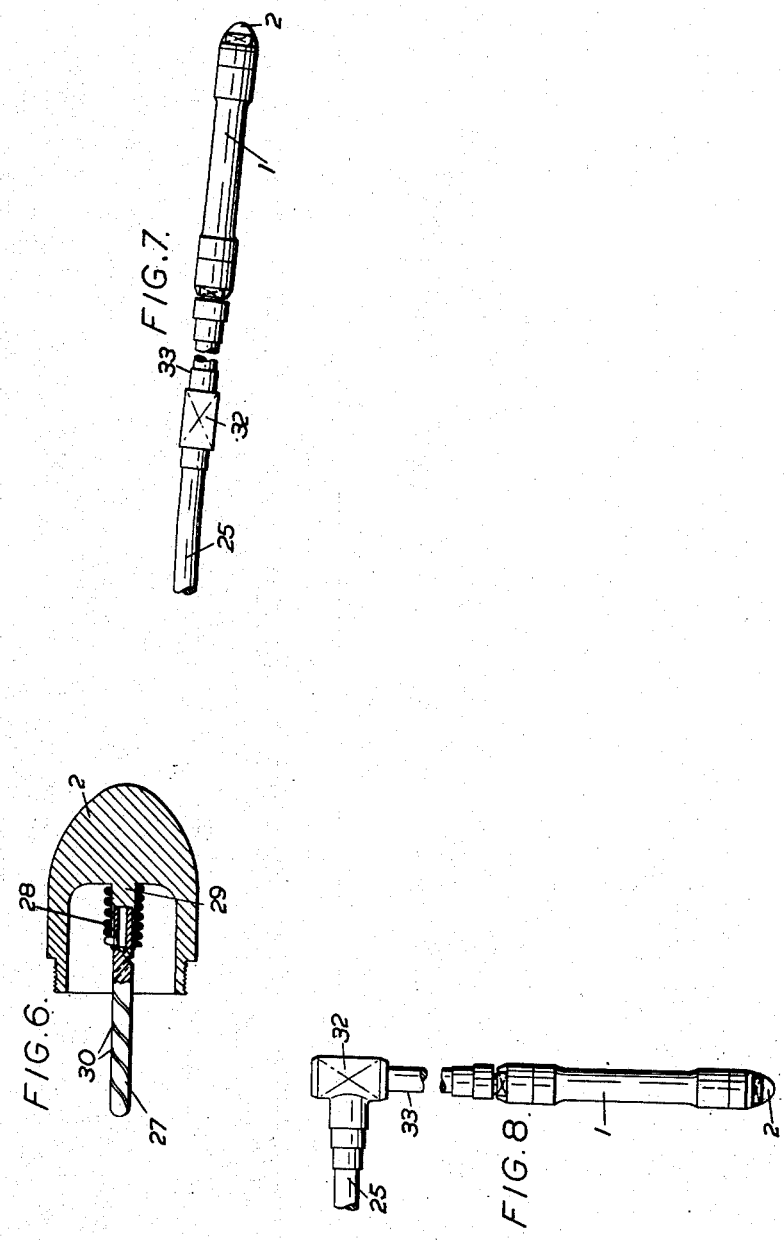

Patented May 11, 1954

2,678,195

UNITED STATES PATENT OFFICE 2,678,195

MECHANICAL VIBRATOR

Percival George Hunter, New Malden, and Leslie Vivian Chandler, Worcester Park, England Application June 7, 1951, Serial No. 230,294

Claims priority, application Great Britain June 15, 1950

17 Claims. (Cl. 259—1)

The invention relates to mechanical vibrators, of the kind used where it is desired to cause movement or flow of solid or liquid materials, e. g. concrete mixes, or to set such materials into vibration for the purpose of forming a compact or homogeneous mixture; or displacement of air bubbles or the like; or of penetration.

The object of the invention is to provide a vibrator of greater mechanical efficiency than those in common use.

With this end in view the invention consists in a mechanical vibrator comprising an eccentric mass rotatable in a casing, drive transmission means whereby said rotatable mass can be connected to a motor, and gearing or like speed-multiplying means associated with said rotatable mass.

The invention will be clearly understood from the following description of forms (given, however, merely by way of example) which it may assume, and this description will be more readily followed by reference to the accompanying drawings wherein:

Figure 1 represents a mechanical vibrator according to the invention in side view, partly in section, with the parts in separated positions:

Figures 2-6 represent details of the device shown in Figure 1, Figure 3 being an end view of the part shown in side view in Figure 2, and Figure 5 being an end view of the part shown in side view in Figure 4, and Figures 7 and 8 represent in side view modified arrangements of mechanical vibrators according to the invention.

In carrying the invention into effect in one convenient manner as shown in Figures 1-6 of the drawings herewith a mechanical vibrator may be formed with a closed cylindrical casing 1 terminating at its lower end in a rounded, conical or tapered nose 2, and at its upper end in an open circular mouth surrounded by an internally—or (as shown) externally—threaded neck 3 for drive entry. This casing may be formed of several separable lengths adapted to be secured together in axial alignment by screwed joints, and may comprise, for example, the lowermost vibrator head portion 2, to which is attached the intermediate tubular portion 1 having attached thereto an intermediate bearing section 4 which at its upper end terminates in the aforementioned open neck, adapted to receive a power transmission coupling 5.

A rotor 6 mounted axially inside the casing 1 extends from the nose to the intermediate bearing portion of the casing, and over a considerable part of its length (more especially that part extending through the intermediate tubular section 1 of the casing) is of considerably increased section, this thickened portion having its axis eccentric of the casing axis. The portions of the shaft adjacent to both ends of the thickened portion are supported by roller bearings 7 running in suitable races 8 located between the shaft and the casing, while in addition ball bearings 9 in a suitable race may be provided for further shaft support.

The rotor 6 is preferably formed of a mild steel body 10 (Figures 2 and 3) with an integral shaft 11 at its lower end, and a separately formed hard steel shaft 12 (Figures 4 and 5) fitted into a suitable recess in its upper end, and held by pins or keys 13. The body and shafts are provided with an axial lubricating duct 14, referred to more fully below.

The upper end of the shaft 12 is longitudinally toothed to form a sungear 15 of an epicyclic gearing system and the inner wall of the casing 1 in line with this sungear is internally toothed, or has secured therein an internally toothed ring 16. The uppermost section 4 of the casing has axially mounted therein a short length of shaft 17 terminating at its lower end in a disc or spider 18 supporting a plurality, e. g. four, of pinions 19 on spindles 20 projecting from the disc or spider 18. These pinions 19 are adapted to engage, as planet wheels, between the abovementioned ring 16 and sungear 15, when the casing sections are connected together, thereby completing coupling between the uppermost transmission shaft 17 and the rotor 6 inside the casing. The short transmission shaft 17 is supported by ball bearings 21 in two spaced races located in the uppermost section 4 of the casing, and the mouth of the casing is closed by a felt or fabricated washer disc 22 which bears against the shaft. The mouth edge of the casing 4 is, as shown, externally threaded, to receive the coupling nut 23 of a flexible transmission shaft outer casing 25, and the free end of the transmission shaft 17 is threaded, or preferably formed with a slot or square recess for engagement with a rigid element 26 secured to form the end of the flexible power-transmission shaft 24, whereby the vibrator shaft 17, and from it the rotor 6 can be rotated at high speed. It will be seen that, due to the eccentricity of the rotor, the casing head is set into violent vibration by this rotation.

At such high speed of rotation lubrication of the rotor bearings and gears is very desirable, and for this purpose according to the invention there is provided, projecting into the lower end of the vibrator shaft 11 a rod 27 which at its bottom end is secured by a coiled spring 28 to a boss 29 axially located inside the head 2, this spring connection forming a self-aligning joint between the rod 27 and the vibrator head. The surface of the rod is cut with one or more helical channels 30. The surrounding space in the vibrator head 2 is filled with oil or grease, and rotation of the shaft 11 drives this lubricant up the helical passageways 30 of the rod in to and through the lubricating duct 14 of the rotor. The gear 15 is provided with radial lubricating ducts 31 through which the lubricant passes to the gears 19 and 16, while the carrier plate 18 carrying the gear supporting pins 20 is provided with other apertures through which the oil passes to the bearings 21 of the driving shaft 17. The gears 19 may also be provided with radial oil ducts similar to those shown in gear 15. The oil is retained by the seal 22 and returns to the oil bath in the head 2 externally of the rotor 6, during which passage it lubricates the bearings 7 and 9 of the rotor.

A vibrator such as described above is driven by a flexible connector linked to an external source of power, and allows the rotor to be operated at very high speeds while the flexible shaft 24 runs at much lower speeds. The flexible drive connection may be of any suitable type, and it is not excluded from the invention to mount an electric or other suitable motor in and as part of the upper section of the vibrator casing being thus in direct, rigid connection with the step-up ratio gear, of the rotor.

In the form of the invention described above the step-up ratio gearing is built into the vibrator casing. In a modified form of the invention the gearing may be built into a separate casing to form an adaptor suitable for connection in the drive to a vibrator (which may, in this case, be of any convenient type, including known forms of vibrator already in use). The embodiments of this form of the invention are shown respectively in Figures 7 and 8 herewith. In these forms of the invention an adaptor 32 comprises a separate casing housing step-up gearing corresponding to the elements 15, 16, 18, 19 and 20 shown in Figure 1. The sungear of this assembly is adapted for detachable connection by a short rigid or flexible drive coupling 33 to the upper end of the rotor in a vibrator 1; while the element corresponding to carrier 18 is provided with a detachable coupling (which may conveniently be substantially the same as shaft 17 engageable with coupling 26) whereby a flexible drive from a prime mover can be connected thereto. In the arrangement shown in Figure 7 the adaptor is arranged for axial coupling with the flexible drive and the vibrator; while in the modification shown in Figure 8 the adaptor may consist of bevel gears or skew gears or worm and worm wheel allowing axial coupling of the adaptor to the vibrator, with the coupling of the flexible drive at any angle to the adaptor axis. Other forms of adaptor may embody spur or helical gearing, for example, allowing the couplings to be cut of alignment but parallel to one another.

If desired any of the forms of the invention described above may be provided with centrifugal clutch means between the flexible drive connected to the vibrator, and the source of power allowing the driving shaft to attain a prearranged speed before the rotor is set in motion.

It should be understood that the invention is not limited solely to the details of the forms described above, which may be modified, in order to meet various conditions and requirements encountered, without departing in any way from the scope of the invention.

What we claim is:

1. A mechanical vibrator comprising a casing, an eccentric rotor provided with an axial bore forming a duct for passage of lubricant and mounted in bearings in said casing, drive transmission means connected to said rotor, a reservoir for lubricant in said casing adjacent to one end of said rotor, and means driven by said motor and housed in said reservoir for causing lubricant to flow through said axial bore in the rotor and thus to reach said rotor bearings.

2. A mechanical vibrator comprising a casing, an eccentric rotor provided with an axial bore forming a duct for passage of lubricant and mounted in bearings in said casing, speed-multiplying gearing in said casing including a gear wheel secured to the termination of said axial bore of said rotor and provided with a radial duct communicating with said rotor bore, drive-transmission means connected to said gearing, a reservoir for lubricant in said casing adjacent to the end of said rotor remote from said gear wheel and means driven by said motor and housed in said reservoir for causing lubricant to flow through said rotor bore, to and through said radial duct of said gear wheel.

3. A mechanical vibrator comprising a casing, an eccentric rotor provided with an axial bore forming a duct for passage of lubricant and mounted in bearings in said casing, epicyclic speed-multiplying gearing in said casing with the sun-gear thereof secured to said rotor, drive-transmission means connected to said epicyclic gearing, a reservoir for lubricant in said casing adjacent to one end of said rotor, and means driven by said rotor and housed in said reservoir for causing lubricant to flow through said bore in the rotor and thus to reach said gearing and said rotor bearings.

4. A mechanical vibrator comprising a casing, an eccentric rotor provided with an axial bore forming a duct for passage of lubricant and mounted in bearings in said casing, epicyclic speed-multiplying gearing in said casing with the sun-gear thereof secured to said rotor, drive-transmission means connected to the planetary gears of said epicyclic gearing, a reservoir for lubricant in said casing surrounding the end of said rotor remote from said gearing and a rod-like abutment having an external helical channel, means driven by said rotor and housed in said reservoir and extending axially of said casing to project into the axial bore of said rotor for causing lubricant to flow along said helical channel into and through said bore in the rotor, and thus to reach said gearing and said rotor bearings.

5. A mechanical vibrator according to claim 4 wherein the sun-gear of said epicyclic gearing is provided with a radial duct communicating with the rotor bore through which duct lubricant from said bore flows to said gearing.

6. A mechanical vibrator of the kind adapted to be operated in a substantially upright position comprising a lubricant reservoir at the lower end of said vibrator, a substantially cylindrical casing closed at one end by said lubricant reservoir and having an eccentric rotor with an axial bore mounted in bearings in said casing, lubricant-feeding means housed in said reservoir and adapted to feed lubricant upwards from said reservoir through the axial bore of said rotor to the upper outlet end thereof and downwardly returning said lubricant externally of said rotor over said rotor bearings to said reservoir.

7. A mechanical vibrator according to claim 6 wherein speed-multiplying gearing is provided housed in said casing and connected to said rotor and having means for connection to a driving coupling, and a duct is provided connected between the end of said axial bore and said gearing to terminate said bore and pass the lubricant fed through said rotor to said gearing in the return of said lubricant to the reservoir.

8. A mechanical vibrator comprising a casing, an eccentric rotor in said casing, and having a longitudinal duct through full length of said rotor, upper and lower bearings in said casing for carrying said rotor, drive-transmission means in said casing connected to said rotor, a reservoir for lubricant in the base of said casing adjacent to the lower end of said rotor, and pump means at the lower end of said rotor for feeding lubricant from said reservoir upwards through said longitudinal duct in said rotor to the upper end thereof and thus to said upper bearings.

9. A mechanical vibrator comprising a casing, an eccentric rotor in said casing and having a longitudinal duct through the full length of said rotor, upper and lower bearings in said casing for carrying said rotor, drive-transmission means including speed-multiplying gearing in said casing connected to said rotor, a reservoir for lubricant in the base of said casing adjacent to the lower end of said rotor, and pump means at the lower end of said rotor for feeding lubricant from said reservoir upwards through said longitudinal duct in said rotor to the upper end thereof and thus to said speed-multiplying gearing and said upper bearings.

10. A mechanical vibrator comprising a casing, an eccentric rotor having an axial bore through its full length in said casing, upper and lower bearings in said casing for carrying said rotor, drive-transmission means in said casing connected to said rotor, a reservoir for lubricant in the base of said casing adjacent to the lower end of said rotor and an abutment housed in said reservoir projecting into the open lower end of said rotor bore, said abutment having an external helical channel in which lubricant is impelled by rotation of said rotor and caused to flow upwards through said rotor bore to reach said upper bearings.

11. A mechanical vibrator according to claim 10 wherein said abutment is a rod located axially in said casing.

12. A mechanical vibrator according to claim 10 wherein said abutment is secured in said casing by resilient supporting means.

13. A mechanical vibrator comprising a casing, an eccentric rotor having an axial bore through its full length in said casing, upper and lower bearings in said casing for carrying said rotor, drive-transmission means in said casing including epicyclic gearing formed of a sun-gear on the upper end of said rotor, and planet gears supported by a carrier and held in mesh with said sun-gears, said sun-gear having a radial duct extending between the rotor bore and the toothed surface of the sun-gear, a reservoir for lubricant in the base of said casing adjacent to the lower end of said rotor, and pump means at the lower end of said rotor for feeding lubricant from said reservoir upwards through said axial bore in said rotor, and through said radial duct in said sun-gear to the meshing surfaces of said epicyclic gearing.

14. A mechanical vibrator according to claim 13 wherein said planet gears are rotatably mounted on pins on said carrier and are each provided with a radial bore for passage of lubricant to said carrier pins.

15. A mechanical vibrator comprising a casing, an eccentric rotor having an axial bore through its full length in said casing, caged upper and lower bearings in said casing for carrying said rotor, drive-transmission means including speed-multiplying gearing in the upper end of said casing connected to said rotor, a reservoir for lubricant in the base of said casing adjacent to the lower end of said rotor, and pump means at the lower end of said rotor for feeding lubricant from said reservoir upwards through said axial bore in said rotor to the upper end thereof and thus to said gearing from which it returns to the reservoir by downward flow externally of said rotor and by way of said bearings.

16. A mechanical vibrator comprising a casing, an eccentric rotor having a longitudinal duct through the full length of said motor in said casing, upper and lower bearings in said casing for carrying said rotor, drive-transmission means in said casing connected to said rotor, a reservoir for lubricant in the base of said casing adjacent to the lower end of said rotor, pump means at the lower end of said rotor for feeding lubricant from said reservoir upwards through said longitudinal duct in said rotor to the upper end thereof and thus to said upper bearings, and a unit separate from said rotor and detachably connected to said rotor, comprising, in a casing, speed-multiplying gearing adapted for connection to a driving shaft whereby drive is communicated through said gearing to said rotor.

17. A mechanical vibrator according to claim 16 wherein said detachable unit comprises epicyclic gearing housed in a closed casing.

References Cited in the file of this patent

UNITED STATES PATENTS

| Number | Name | Date |
| --- | --- | --- |
| 2,198,148 | Baily | Apr. 23, 1940 |
| 2,198,921 | Shaff | Apr. 30, 1940 |
| 2,209,120 | Hoffman | July 23, 1940 |
| 2,309,033 | Baily | Jan. 19, 1943 |
| 2,454,620 | Wilde | Nov. 23, 1948 |
| 2,479,799 | Wilde | Aug. 23, 1949 |
| 2,597,505 | Lindkvist | May 20, 1952 |